(12) United States Patent
Takada et al.

(10) Patent No.: US 12,379,764 B2
(45) Date of Patent: Aug. 5, 2025

(54) POWER CONTROL APPARATUS AND METHOD

(71) Applicant: Hitachi, Ltd., Tokyo (JP)

(72) Inventors: Masanori Takada, Tokyo (JP); Akira Yamamoto, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 72 days.

(21) Appl. No.: 18/469,175

(22) Filed: Sep. 18, 2023

(65) Prior Publication Data
US 2024/0361822 A1 Oct. 31, 2024

(30) Foreign Application Priority Data
Apr. 28, 2023 (JP) ................ 2023-074741

(51) Int. Cl.
| | |
|---|---|
| G06F 1/00 | (2006.01) |
| G06F 1/3234 | (2019.01) |
| G06F 1/3203 | (2019.01) |

(52) U.S. Cl.
CPC .......... *G06F 1/3234* (2013.01); *G06F 1/3203* (2013.01)

(58) Field of Classification Search
CPC .... G06F 1/3234; G06F 1/3203; G06F 1/3221; G06F 1/3268; G06F 1/3275; G06F 3/0625; G06F 3/0634
USPC ....................................................... 713/320
See application file for complete search history.

(56) References Cited

U.S. PATENT DOCUMENTS

| | | | | |
|---|---|---|---|---|
| 2007/0277046 A1* | 11/2007 | Yasuda | .................. | G06F 1/3203 713/300 |
| 2008/0126816 A1* | 5/2008 | Prete | ................... | G06F 13/1673 713/323 |
| 2008/0294920 A1* | 11/2008 | Hatasaki | ............... | G06F 1/3228 713/323 |
| 2009/0210732 A1* | 8/2009 | Aoyagi | .............. | H04N 1/00885 713/320 |
| 2011/0185201 A1* | 7/2011 | Kawakami | ........... | G11B 19/209 713/320 |
| 2011/0283121 A1* | 11/2011 | Kuroda | .................. | G06F 1/3203 713/310 |
| 2011/0283123 A1* | 11/2011 | Shigemura | ............ | G06F 3/0634 713/320 |

(Continued)

FOREIGN PATENT DOCUMENTS

JP 2019-091152 A 6/2019

*Primary Examiner* — Volvick Derose

(74) *Attorney, Agent, or Firm* — Procopio, Cory, Hargreaves & Savitch LLP

(57) ABSTRACT

When receiving power requirement for power control and performing power control of a target device in accordance with the received power requirement, based on power consumption for a performance of each component of the target device and a device configuration of the target device, power saving level management information is created, which respectively defines the performance of each component at each power saving level associated with each of a plurality of divided power consumption ranges of the target device, and based on a power consumption upper limit value or the power saving level of the target device designated as the received power requirement, the power saving level management information is referred to and the performance of each component is set to a performance of the power saving level according to the power requirement, respectively.

10 Claims, 11 Drawing Sheets

(56) References Cited

U.S. PATENT DOCUMENTS

| | | | |
|---|---|---|---|
| 2018/0024602 A1* | 1/2018 | Matsumoto | G06F 1/26 713/320 |
| 2019/0146572 A1* | 5/2019 | Nakanishi | G06F 1/28 713/324 |
| 2019/0384513 A1* | 12/2019 | Matsubara | G06F 3/0653 |
| 2024/0429815 A1* | 12/2024 | Zhang | H03K 3/037 |

* cited by examiner

FIG. 3

DEVICE CONFIGURATION MANAGEMENT TABLE 30

| COMPONENT KIND | MOUNTING POSITION | COMPONENT TYPE |
|---|---|---|
| Host I/F | #0 | 32Gbps Fibre Channel |
| | #1 | 32Gbps Fibre Channel |
| | #2 | 100Gbps iSCSI |
| | #3 | 100Gbps iSCSI |
| MEMORY | #0 | 64GB |
| | #1 | 64GB |
| | #2 | 32GB |
| | #3 | 32GB |
| DRIVE | #0 | 16TB SSD |
| | #1 | 16TB SSD |
| | #2 | 16TB SSD |
| | #3 | 16TB SSD |
| | #4 | 30GB HDD |
| | #5 | 30GB HDD |
| | #6 | 30GB HDD |
| | #7 | 30GB HDD |

POWER CONSUMPTION MANAGEMENT TABLE 31

| COMPONENT KIND | COMPONENT TYPE | POWER CONSUMPTION PER PERFORMANCE LEVEL |
|---|---|---|
| Host I/F | 32Gbps Fibre Channel | 0: 24W<br>1: 18W<br>2: 8W |
| | 100Gbps iSCSI | 0: 30W<br>1: 20W<br>2: 12W |
| MEMORY | 64GB | 0: 10W<br>1: 2W |
| | 32GB | 0: 6W<br>1: 1W |
| DRIVE | 8TB SSD | 0: 18W<br>1: 12W<br>2: 8W<br>3: 6W |
| | 16TB SSD | 0: 24W<br>1: 18W<br>2: 12W<br>3: 8W |
| | 15GB HDD | 0: 20W<br>1: 18W<br>2: 10W<br>3: 8W |
| | 30GB HDD | 0: 24W<br>1: 20W<br>2: 12W<br>3: 10W |
| CPU | - | 3.0GHz: 200W<br>2.4GHz: 160W<br>1.8GHz: 130W<br>1.2GHz: 90W |
| INTERNAL PATH | - | 0: 10W<br>1: 8W<br>2: 4W |

POWER SAVING LEVEL MANAGEMENT TABLE 32

| POWER SAVING LEVEL | POWER CONSUMPTION [W] | CPU STATE | INTERNAL PATH STATE | DRIVE STATE | HOST I/F STATE | MEMORY STATE |
|---|---|---|---|---|---|---|
| Lv0 | 1500~1800 | 3.0GHz | 0 | 0 | 0 | 0 |
| Lv1 | 1200~1500 | 2.4GHz | 0 | 1 | 1 | 0 |
| Lv2 | 1000~1200 | 1.8GHz | 1 | 2 | 2 | 0 |
| Lv3 | 0~1000 | 1.2GHz | 2 | 3 | 2 | 1 |
| 32A | 32B | 32C | 32C | 32C | 32C | 32C |

FIG. 6

SET POWER REQUIREMENT MANAGEMENT TABLE 33

| POWER SAVING LEVEL | 2 | }33A |
| --- | --- | --- |
| LOW-LOAD AUTOMATIC POWER REDUCTION FUNCTION | INVALID | }33B |

FIG. 7

| API FUNCTION | INPUT | RESPONSE |
|---|---|---|
| STATE ACQUISITION | - | ·POWER CONTROL METHOD (INVALID/UPPER LIMIT/LEVEL) ·SET VALUE |
| POWER CONTROL METHOD SETTING | ·POWER CONTROL METHOD (INVALID/UPPER LIMIT/LEVEL) ·SET VALUE | SUCCESS / FAILURE |
| LOW-LOAD POWER REDUCTION FUNCTION SETTING | ON/OFF | SUCCESS / FAILURE |
| LOW-LOAD POWER REDUCTION FUNCTION SET VALUE ACQUISITION | - | ON/OFF |

POWER CONTROL APPARATUS AND METHOD

BACKGROUND OF THE INVENTION

1. Field of the Invention

The present invention relates to a power control apparatus and method, which are suitable for application in storage devices, for example.

2. Description of Related Art

In recent years, environmental concerns and the like have raised a need for power saving in storage devices. In addition, there is also a need to reduce power even at the expense of performance.

In the related art, in order to reduce the power consumption of the storage device, methods have been proposed as a power reduction method, such as reducing drive power consumption by data migration and the like, lowering an operating frequency of a Central Processing Unit (CPU) when the storage device is in idle state, or the like. For example, JP2019-91152A discloses a technique for transitioning a device in a storage device to a power saving mode when a load is low.

However, according to the power reduction method by the data migration, there is a problem that the data migration takes a considerable amount of time, and advance preparations for the data migration and creation of application schedules are required. There is also a problem that the data migration consumes power.

In addition, according to the power reduction method of lowering the operating frequency of the CPU, there is a problem that power reduction cannot be guaranteed unless loads imposed from the outside such as input/output (I/O) from a host, and internal processing performed in the storage device such as garbage collection, cannot be controlled.

As described above, the power reduction techniques in the related art have a problem that it is difficult to easily and quickly perform power control.

SUMMARY OF THE INVENTION

The invention has been made in view of the issues mentioned above, and accordingly, proposes a power control apparatus and method capable of easily and quickly performing power control.

In order to solve this problem, according to the invention, a power control apparatus that performs power control of a target device equipped with one or a plurality of components capable of controlling power consumption by lowering a performance, includes: a management interface unit configured to receive power requirement for performing the power control, and a power control unit configured to perform the power control of the target device in accordance with the power requirement received by the management interface unit, in which the power control unit is configured to, based on power consumption for the performance of each component of the target device and a device configuration of the target device, create power saving level management information that respectively defines the performance of each component at each power saving level associated with each of a plurality of divided power consumption ranges of the target device, and based on a power consumption upper limit value or the power saving level of the target device designated as the power requirement received by the management interface unit, refer to the power saving level management information and set the performance of each component to a performance of the power saving level according to the power requirement, respectively.

Further, according to the invention, a power control method executed by a power control apparatus that performs power control of a target device equipped with one or a plurality of components capable of controlling power consumption by lowering a performance, includes: a first step of receiving power requirement for performing the power control, and a second step of performing the power control of the target device in accordance with the received power requirement, in which, in the second step, the power control apparatus is configured to, based on power consumption for the performance of each component of the target device and a device configuration of the target device, create power saving level management information that respectively defines the performance of each component at each power saving level associated with each of a plurality of divided power consumption ranges of the target device, and based on a power consumption upper limit value or the power saving level of the target device designated as the received power requirement, refer to the power saving level management information and set the performance of each component to a performance of the power saving level according to the power requirement, respectively.

According to the power control apparatus and method of the invention, it is possible to quickly reduce the power consumption of the target device without requiring advance preparation or schedule creation.

According to the invention, the power control apparatus and method can be implemented, which can perform power control easily and quickly.

BRIEF DESCRIPTION OF THE DRAWINGS

FIG. 3 is a chart showing a configuration of a device configuration management table;

FIG. 4 is a chart showing a configuration of a power consumption management table;

FIG. 5 is a chart showing a configuration of a power saving level management table;

FIG. 6 is a chart showing a configuration of a set power requirement management table;

FIG. 7 is a chart provided to explain functions of a management API unit;

DESCRIPTION OF EMBODIMENTS

An embodiment of the invention will be described in detail with reference to the drawings.

(1) Configuration of Storage System According to the Present Embodiment

Figure 1:
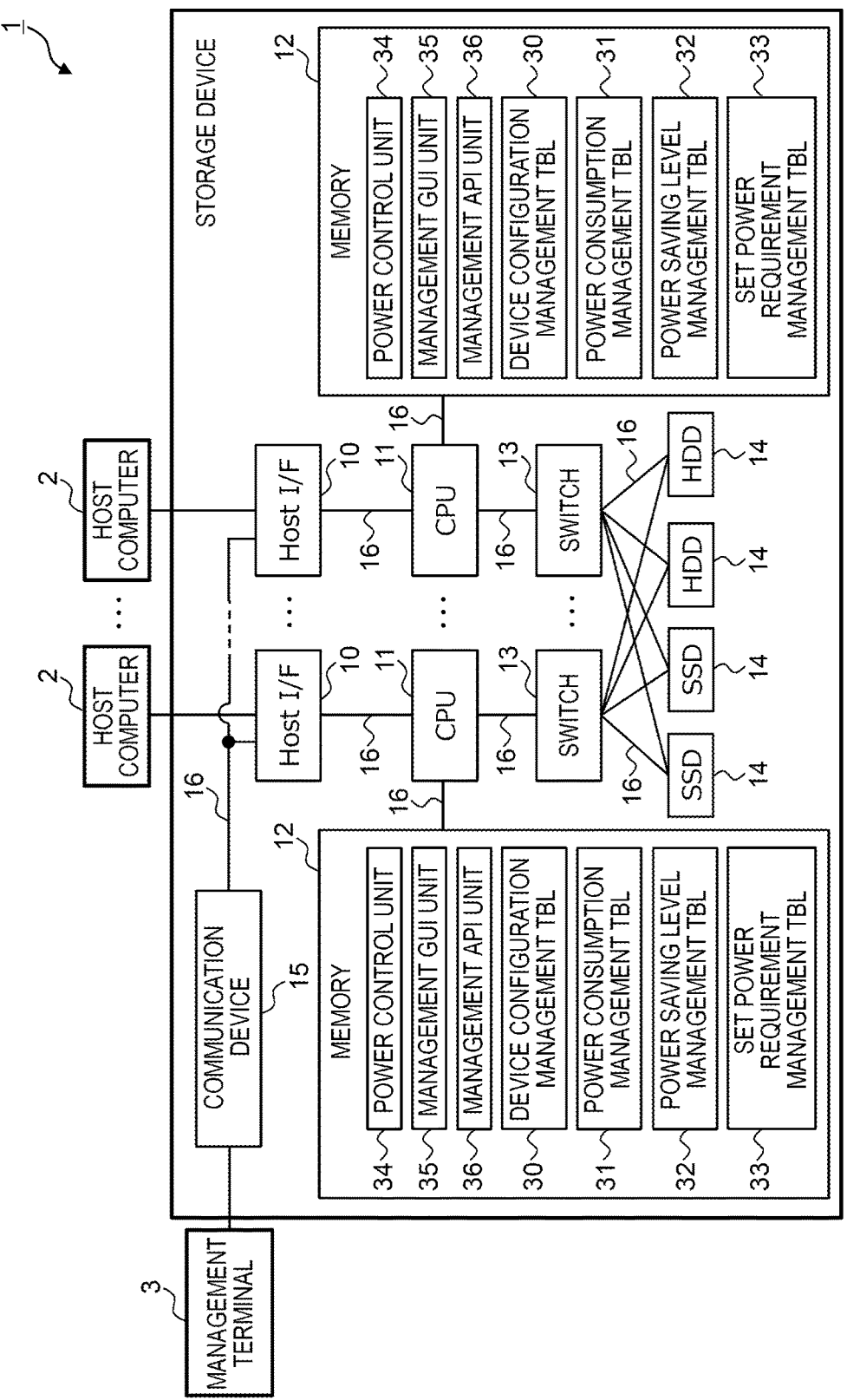
FIG. 1 is a block diagram showing an overall configuration of a storage system according to the present embodiment.

In FIG. 1, a reference numeral 1 denotes a storage system according to the present embodiment as a whole. The storage system 1 includes one or a plurality of host computers 2, a management terminal 3, and a storage device 4.

The host computer 2 is a host device of the storage device 4, and includes a general-purpose computer device such as a server device. The host computer 2 reads and writes necessary data to and from the storage device 4 in response to an operation of a user or a request from an embedded program.

The management terminal 3 is a computer device used by an administrator of the storage device 4. The management terminal 3 calls the necessary Application Programming Interface (API) to the storage device 4 in response to an operation of the administrator or the request from the embedded program, or displays various Graphical User Interface (GUI) screens s such as a power requirement reference and change screen 20, which will be described below with reference to FIG. 2, based on screen data given from the storage device 4.

The storage device 4 is a storage device that provides a storage area for reading and writing data from and to the host computer 2. The storage device 4 includes a host interface 10, a CPU 11, a memory 12, and a switch 13, which are provided for each corresponding host computer 2, a plurality of drives 14, a communication device 15, and an internal path 16 interconnecting the host interface 10, the CPU 11, the memory 12, the switch 13, the drives 14, and the communication device 15.

The host interface 10 includes, for example, a Network Interface Card (NIC) or the like, and performs protocol control when the storage device 4 communicates with the host computer 2 via a network (not shown).

The CPU 11 is a processor that controls the overall operation of the storage device 4. Further, the memory 12 includes a volatile semiconductor memory and the like, for example, and is used as a working memory for the CPU 11. Programs and information stored in some of the drives 14 are read out to the memory 12 when the storage device 4 is activated or when necessary, and the CPU 11 executes the program loaded in the memory 12, thereby executing various processes of the storage device 4 as a whole, which will be described below.

The drive 14 includes a nonvolatile large-capacity storage device such as a hard disk device or a Solid State Drive (SSD), and provides the storage area for reading and writing data from and to the host computer 2.

The switch 13 is a switching device connected between the CPU 11 and each drive 14, and switches the drive 14 which is the connection destination of the CPU 11 according to instructions from the CPU 11. This allows the CPU 11 to read and write data from and to the storage area provided by the desired drive 14.

The communication device 15 includes a Local Area Network (LAN) card or the like, for example, and performs protocol control when communicating with the management terminal 3 connected via a LAN (not shown) or the like.

(2) Power Control Function According to the Present Embodiment

Next, a power control function of the present embodiment embedded in the storage device 4 will be described. At this time, first, details of various requirements (hereinafter, referred to as "power requirements") set in the storage device 4 in advance by the administrator for power control of the storage device 4 will be described.

In the case of the storage system 1 of the present embodiment, the administrator can set, by operating the management terminal 3, the power requirements including an upper limit of the power consumption of the storage device 4, a power saving level of the storage device 4, and valid and invalid state of the function of automatically reducing an amount of the power consumption at a low load (hereinafter, referred to as "low-load automatic power reduction function").

The "power saving level" herein refers to a power saving level applicable when the power saving in the storage device 4 is performed by lowering the performance of components of which power consumption is controllable (hereinafter, referred to as "controllable power consumption components"), such as by lowering the performance of the host interface 10, the CPU 11, the memory 12, the drives 14, the internal paths 16, or the like of the components of the storage device 4.

The power saving level is defined by associating with each of a plurality of divided power ranges of the power consumption of the storage device 4. It is to be noted that the "power consumption of the storage device" herein refers to a total value of the power consumption of all controllable power consumption components mounted in the storage device 4. The same applies to the following. In the present embodiment, four levels of level 0 to level 3 are defined as the power saving levels.

Level 0 is a power saving level that maximizes the performance of each controllable power consumption component in the storage device 4 (that is, that does not lower the performance of each controllable power consumption component at all). In the following description, it is assumed that the power consumption of the storage device 4 with the power saving level at level 0 is about 1,500 W to 1,800 W.

Level 1 is a power saving level that lowers the performance of some or all of the controllable power consumption components of the storage device 4, and the power consumption of the storage device 4 is controlled to 1,200 W to 1,500 W, for example.

Level 2 is a power saving level that lowers the performance of some or all of the controllable power consumption components of the storage device 4 further than level 1, and the power consumption of the storage device 4 is controlled to 1,000 W to 1,200 W, for example.

Level 3 is a power saving level that lowers the performance of some or all of the controllable power consumption components of the storage device 4 further than level 2, and the power consumption of the storage device 4 is controlled to 0 W to 1,000 W, for example.

"Low load" in the low-load automatic power reduction function refers to a state in which the number of I/Os from the host computer 2 during a predetermined period of time (e.g., 5 minutes) is equal to or less than a preset threshold value. In the present embodiment, a method for lowering the performance of all controllable power consumption components registered in the storage device 4 to the lowest level is applied as a method for "reducing the amount of the power consumption".

Figure 2:
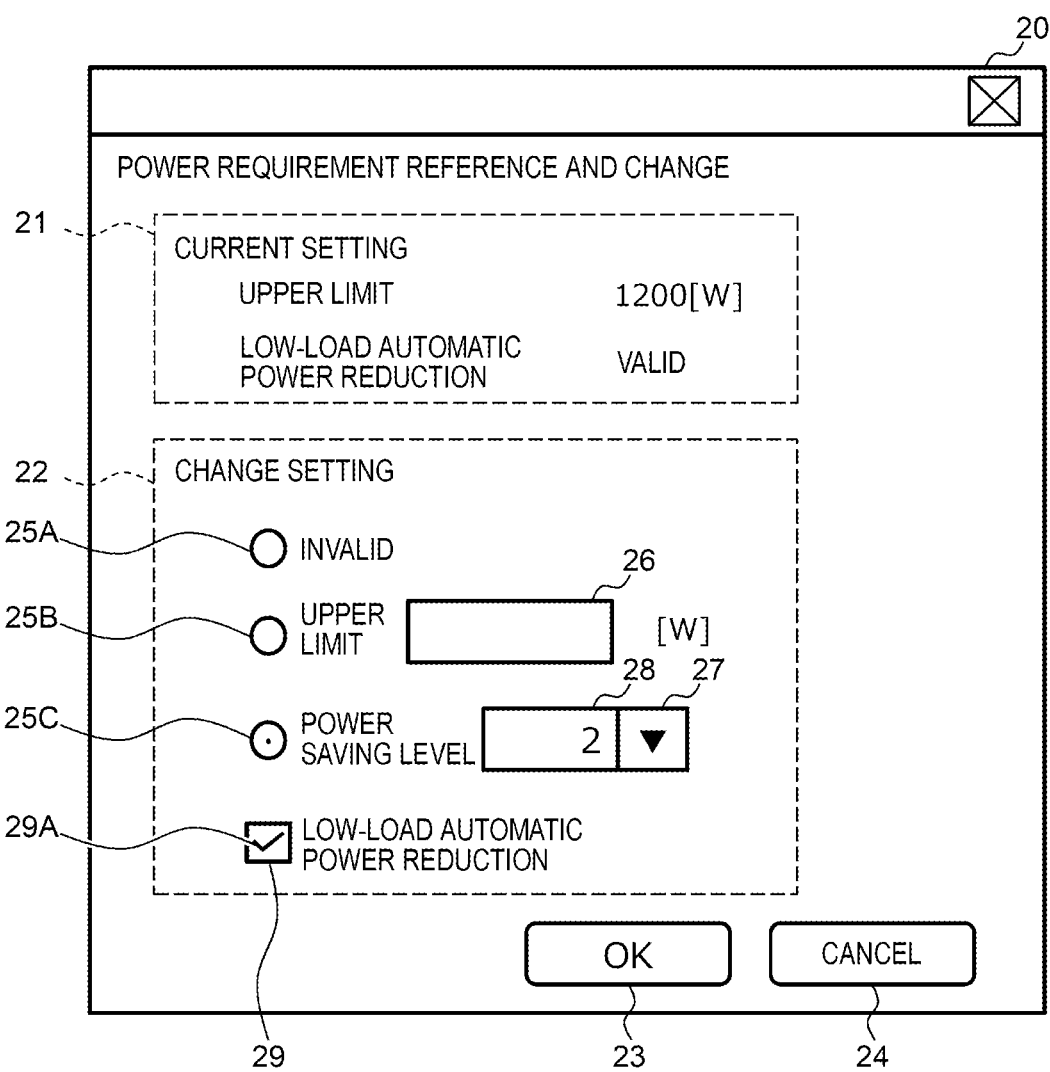
FIG. 2 is a diagram showing a screen configuration example of a power requirement reference and change screen.

FIG. 2 shows a screen configuration example of a power requirement reference and change screen 20 that can be displayed on the management terminal 3 in response to a predetermined operation. The power requirement reference and change screen 20 is a screen for the administrator to refer to the setting details of the power requirements currently set in the storage device 4 or to change the setting details.

As shown in FIG. 2, the power requirement reference and change screen 20 includes a current setting display area 21, a setting change area 22, an OK button 23, and a cancel button 24.

The setting details of the power requirements currently set in the storage device 4 are displayed in the current setting display area 21. FIG. 2 shows a display example in which an upper limit value of the power consumption of the storage device 4 and a set value ("valid", in this example) of the low-load automatic power reduction function set in the storage device 4, as the power requirements.

In addition, in the setting change area 22, there are displayed first to third radio buttons 25A to 25C corresponding to each of first to third power control methods prepared as options for the power control method (hereinafter, referred to as "normal power control method") of the storage device 4 during normal operation, which is the first power requirement of the storage device 4.

The first power control method is a power control method that invalidates the setting of the power requirements of the storage device 4 (i.e., that does not control the power consumption of the storage device 4). The administrator may click the first radio button 25A to transition the display state to the selected state, thereby designating the first power control method as the normal power control method to be set in the storage device 4.

The second power control method is a power control method that controls the power consumption of the storage device 4 so as to be equal to or less than the upper limit designated by the administrator. Therefore, the setting change area 22 is provided with a text box 26 corresponding to the second radio button 25B.

Then, the administrator may input a desired numerical value as the upper limit value of the power consumption of the storage device 4 into the text box 26, and click the second radio button 25B to transition the display state to the selected state, thereby designating the second power control method as the normal power control method to be set in the storage device 4.

The third power control method is a power control method that sets the power consumption of the storage device 4 to a power saving level designated by the administrator. In the present embodiment, there are four levels from level 0 to level 3 as the power saving levels of the storage device as described above.

The setting change area 22 is provided with a pull-down menu button 27 corresponding to the third radio button 25C. Further, a pull-down menu (not shown) is displayed when the pull-down menu button 27 is clicked, showing names of the four power saving levels (level 0 to level 3). By selecting the name of a desired power saving level from among the names of these four power saving levels, the power saving level can be designated as the power saving level to be set in the storage device 4. The power saving level designated as described above is displayed in a power saving level display box 28 provided on the left side of the pull-down menu button 27.

Thus, the administrator may designate the desired power saving level as the power saving level to be set in the storage device 4 as described above, and designate the third power control method as the normal power control method to be set in the storage device 4 by clicking the third radio button 25C to transition the display state to the selected state.

Furthermore, a check box 29 is provided in the setting change area 22, and the user may click the check box 29 to mark a check mark 29A in the check box 29, thereby designating "valid" as the set value of the low-load automatic power reduction function described above, which is another power requirement to be set in the storage device 4.

Then, the administrator may designate, among the first to third power control methods, the desired power control type as the normal power control method to be set in the storage device 4 as described above, and, if necessary, designate the upper limit value and the power saving level of the power consumption of the storage device 4, further designate valid or invalid state of the low-load automatic power reduction function, and click the OK button 23, thereby transmitting designated details to the storage device 4 as the power requirement information.

Further, the administrator may click the cancel button 24 to discard all the various designations previously made on the power requirement reference and change screen 20, and then close the power requirement reference and change screen 20.

Meanwhile, when the power requirement information described above is given from the management terminal 3, according to the details of this power requirement information, the storage device 4 sets the operation mode of each controllable power consumption component to the operation mode of the performance level according to the details of the power requirement information, respectively so as to control its own power consumption within the upper limit value designated by the administrator or within the range of the power saving level designated by the administrator. Hereinafter, this function of the storage device 4 will be referred to as the power control function of the present embodiment.

In order to implement the power control function of the present embodiment, as shown in FIG. 1, the memory 12 of the storage device 4 stores, as management information, a device configuration management table 30, a power consumption management table 31, a power saving level management table 32, and a set power requirement management table 33, and stores, as programs, a power control unit 34, a management GUI unit 35, and a management API unit 36.

The device configuration management table 30 is a table used to manage each controllable power consumption component mounted in the storage device 4, and is created in advance and given to the storage device 4.

As shown in FIG. 3, the device configuration management table 30 includes a component kind column 30A, a mounting position column 30B, and a component type column 30C. In the device configuration management table 30, one record (row) in the component kind column 30A corresponds to one kind of controllable power consumption component (hereinafter, referred to as "component kind") mounted in the storage device 4.

The component kind corresponding to the controllable power consumption component mounted in the storage device 4 is stored in the component kind column 30A.

In addition, the mounting position column 30B and the component type column 30C are classified in association with the slots in which the controllable power consumption components of the corresponding component kinds are mounted, respectively. Each section of the classified mounting position column 30B stores the corresponding slot number, and each section of the classified component type column 30C stores the type of the controllable power consumption component (hereinafter, referred to as "component type") of the corresponding component kind mounted in the corresponding slot.

Therefore, in the example of FIG. 3, for example, for the controllable power consumption components of component kind "Host I/F (host interface)", it is shown that the component types of the host interface mounted in the slots "#0" and "#1" are both fiber channels with a transfer rate of 32 Gbps ("32 Gbps Fibre Channel"), and it is shown that the component types of the host interface mounted in the slots "#2" and "#3" are both iSCSI with a transfer rate of 100 Gbps ("100 Gbps iSCSI").

The power consumption management table 31 is a table storing the power consumption for each performance level for each component type of the controllable power consumption components mounted in the storage device 4, and is created in advance and given to the storage device 4.

The power consumption management table 31 includes a component kind column 31A, a component type column 31B, and a power consumption per performance level column 31C. In the power consumption management table 31, one record (row) in the component kind column 31A corresponds to one component kind of the controllable power consumption component.

The component kind column 31A stores the component kinds of the corresponding controllable power consumption components, respectively. FIG. 4 shows that "Host I/F", "memory", "drive", "CPU" and "internal path" are mounted in the storage device 4 as the controllable power consumption components.

In addition, the component type column 31B and the power consumption per performance level column 31C are classified in association with the component types of the corresponding component kind of controllable power consumption components, which are actually mounted in the storage device 4, respectively.

Then, each section of the classified component type column 31B stores the corresponding component type of the corresponding controllable power consumption component. For example, for the controllable power consumption component of "Host I/F", FIG. 4 shows that "Host I/F" of the component type "32 Gbps Fibre Channel" and "Host I/F" of the component type "100 Gbps iSCSI" are actually mounted in the storage device 4.

Further, each section of the classified power consumption per performance level column 31C stores the power consumption for each operation mode of several performance levels of the controllable power consumption component of the corresponding component kind and the corresponding component type, respectively.

For example, FIG. 4 shows that the controllable power consumption component of "32 Gbps Fibre Channel" of "Host I/F" has a power consumption of "24 W" in an operation mode with the performance level of "0" (e.g., performance of 370 kIOPS), a power consumption of "18 W" in an operation mode with the performance level of "1" (e.g., performance of 210 kIOPS), and a power consumption of "8 W" in an operation mode with the performance level of "2" (e.g., performance of 110 kIOPS).

In addition, FIG. 4 shows that the controllable power consumption component of "64 GB" of "memory" has a power consumption of "10 W" in an operation mode with the performance level of "0" (a normal state in which data can be read and written) and a power consumption of "2 W" in an operation mode with the performance level of "1" (a state in which data is retained but cannot be accessed).

Furthermore, FIG. 4 shows that the controllable power consumption component of "8 TB SSD" of the "drive" has a power consumption of "18 W" in an operation mode with the performance level of "0" (the highest power state), a power consumption of "12 W" in an operation mode with the performance level of "1" (the next highest power state), a power consumption of "8 W" in an operation mode with the performance level of "2" (the second highest power state from the bottom), and a power consumption of "6 W" in an operation mode with the performance level "3" (the lowest power state).

Furthermore, FIG. 4 shows that the controllable power consumption component of "CPU" has a power consumption of "200 W" in an operation mode with an operating frequency of 3.0 GHz, a power consumption of "160 W" in an operation mode with an operating frequency of "2.4 GHZ", a power consumption of "130 W" in an operation mode with an operating frequency of "1.8 GHZ", and a power consumption of "90 W" in an operation mode with an operating frequency of "1.2 GHZ".

Furthermore, FIG. 4 shows that the controllable power consumption component of "internal path" has a power consumption of "10 W" in an operation mode with the performance level of "0" (e.g., a state in which four paths are used), a power consumption of "8 W" in an operation mode with the performance level of "1" (e.g., a state in which three paths are used), and a power consumption of "4 W" in an operation mode with the performance level of "2" (e.g., a state in which one path is used).

It is to be noted that, for the power consumption for each performance level of each component type of each component kind in the power consumption management table 31, the power consumption provided by the component manufacturer may be applied, or the power consumption measured in advance may be applied.

The power saving level management table 32 is a table that stores information indicating, for each power saving level, which performance level is to be set for the performance level of each controllable power consumption component. This is created by the power control unit 34 which will be described below.

As shown in FIG. 5, the power saving level management table 32 includes a power saving level column 32A, a power consumption column 32B, and state columns 32C for each of the component kinds of the controllable power consumption components mounted in the storage device 4. In the power saving level management table 32, one record (row) corresponds to one power saving level.

The power saving level column 32A stores the name of the corresponding power saving level, and the power consumption column 32B stores the power consumption range of the storage device 4 at the corresponding power saving level. Further, each of the state columns 32C stores the performance level to be set for the controllable power consumption component of the corresponding component kind when the corresponding power saving level is designated by the administrator.

Therefore, in the example of FIG. 5, when the power saving level is "Lv0", the power consumption of the storage device 4 is controlled to "1,500 W to 1,800 W", and in this case, it is indicated that the CPU 11 (FIG. 1) is to be set to an operation mode with an operating frequency of "3.0 GHz", the internal path 16 (FIG. 1) is to be set to an operation mode with the performance level of "0", the drive 14 (FIG. 1) is to be set to an operation mode with the performance level of "0", the host interface 10 (FIG. 1) is to be set to an operation mode with the performance level of "0", and the memory 12 (FIG. 1) is to be set to an operation mode with the performance level of "0".

The set power requirement management table 33 is a table used to manage the setting details of the power requirements set by the administrator using the power requirement reference and change screen 20 described above with reference to FIG. 2, and includes a power consumption upper limit value and power saving level column 33A and a low-load automatic power reduction function column 33B as shown in FIG. 6.

When the power requirement set by the administrator is the upper limit value of the power consumption of the storage device 4 (when the power control method set by the administrator is the second power control method described above), a value of the power saving level in the power range that does not exceed the upper limit value is stored in the power consumption upper limit value and power saving level column 33A, and when the power requirement set by the administrator is the power saving level (when the power control method set by the administrator is the third power control method described above), a value of the power saving level is stored.

The low-load automatic power reduction function column 33B stores information representing a set value of the low-load automatic power reduction function set by the administrator. In the example of FIG. 6, "valid" is stored when the administrator designates that t low-load automatic power reduction function is valid, and "invalid" is stored when the administrator designates that the low-load automatic power reduction function is invalid.

Therefore, in the example of FIG. 6, it is shown that, as the power requirement, the administrator sets the power saving level to "2", and sets the low-load automatic power reduction function to "invalid".

Meanwhile, the power control unit 34 (FIG. 1) is a program having a function of executing various processes related to the power control function of the present embodiment described above. The management GUI unit 35 is a program having a function of transmitting the screen data of the power requirement reference and change screen 20 described above with reference to FIG. 2 to the management terminal 3, in response to a request from the management terminal 3. The power requirement reference and change screen 20 of FIG. 2 is displayed on the management terminal 3 based on the screen data.

Furthermore, the management API unit 36 is a program having a function of delivering various requests and instructions given from the management terminal 3 to the corresponding programs embedded in the storage device 4, and transmitting the processing results of the requests and instructions notified from the programs to the management terminal 3.

In relation to the power control function of the present embodiment, the management API unit 36 has functions such as "state acquisition", "power control method setting", "low-load power reduction function setting", and "low-load power reduction function set value acquisition" as shown in FIG. 7, for example.

The "state acquisition" function is a function executed when a request to acquire current power requirement, which indicates that the setting details of the current power requirements of the storage device 4 is to be acquired, is given from the management terminal 3 when the management terminal 3 displays the power requirement reference and change screen 20 described above with reference to FIG. 2, and the like. With this function, the management API unit 36 delivers the request to acquire the current power requirement to the power control unit 34, and transmits, as a response, the power control method (first to third power control methods described above) set in the storage device 4 at that time notified from the power control unit 34 as a result and a set value of the power control method, to the management terminal 3.

It is to be noted that the "set value of the power control method" herein is the upper limit value of the power consumption of the storage device 4 when the second power control method described above is set in the storage device 4 as the power control method, and is the power saving level when the third power control method described above is set in the storage device 4 as the power control method.

The "power control method setting" function is a function that is executed when the power requirement information described above is given from the management terminal 3. With this function, the management API unit 36 inputs the power control method (first, second, or third power control method) to be set in the storage device 4 and the set value included in the power requirement information, and delivers the same to the power control unit 34. In addition, the management API unit 36 transmits, to the management terminal 3, a processing result indicating whether the setting is succeeded or failed, which is notified from the power control unit 34 as a result.

The "low-load power reduction function setting" function is also a function that is executed when the power requirement information described above is given from the management terminal 3. With this function, the management API unit 36 delivers the set value (ON/OFF) of the low-load power reduction function included in the power requirement information, to the power control unit 34. In addition, the management API unit 36 transmits, to the management terminal 3, a processing result indicating whether the setting is succeeded or failed, which is notified from the power control unit 34 as a result.

Furthermore, the "low-load power reduction function set value acquisition" function is a function that is executed when the request to acquire the current power requirement described above is given from the management terminal 3. With this function, the management API unit 36 delivers the request to acquire the current power requirement to the power control unit 34, and transmits the set value of the low-load power reduction function at that time notified from the power control unit 34 as a result, to the management terminal 3.

(3) Various Processes Executed in Relation to the Power Control Function of the Present Embodiment Next, processing procedures of various processes executed in the storage device 4 in relation to the power control function will be described. It goes without saying that although the "program (the power control unit 34)" is described as a processing entity of various processes in the following description, in practice, the CPU 11 executes the processes based on the "program".

(3-1) Power Requirement Setting Process

Figure 8:
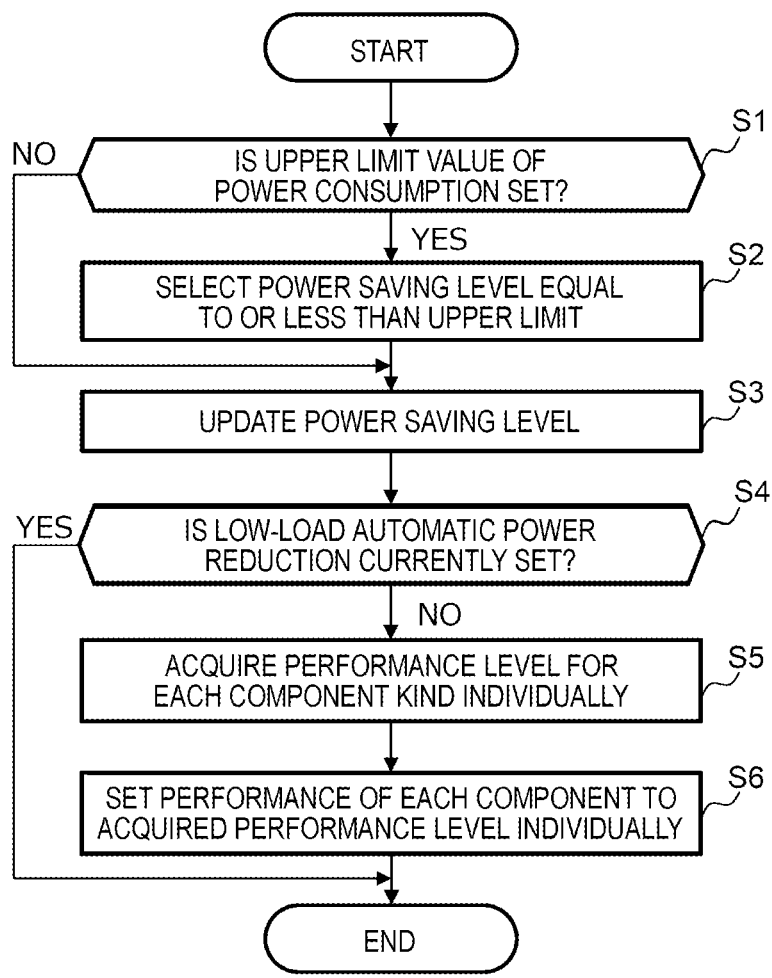
FIG. 8 is a flowchart showing a processing procedure of a power requirement setting process.

FIG. 8 shows the flow of a series of processes (hereinafter, referred to as "power requirement setting process") executed by the power control unit 34 (FIG. 1) of the storage device 4 when the upper limit value or the power saving level of the power consumption of the storage device 4 designated by the administrator on the power requirement reference and change screen 20 described above with reference to FIG. 2, and the set value (valid and invalid) of the low-load automatic power reduction function are given from the management terminal 3 to the storage device 4 as the power requirement information.

When the storage device 4 receives the power requirement information, the power control method (first, second, or third power control method) and the set values to be set in the storage device 4, and the set values of the low-load power reduction function, which are included in the power requirement information, are delivered from the management API unit 36 to the power control unit 34.

When the power control unit 34 receives the power control method and the set values, and the set value of the low-load power reduction function, the power control unit 34 starts the power requirement setting process shown in FIG. 8, and first determines whether the power control method designated by the administrator involves designation of the upper limit value of the power consumption of the storage device 4 (second power control method) (S1). When a negative result is obtained in this determination, the power control unit 34 proceeds to step S3.

On the other hand, when a positive result is obtained in the determination in step S1, the power control unit 34 refers to the power consumption column 32B (FIG. 5) of each record in the power saving level management table 32 (FIG. 5), and selects a power saving level at which the power consumption of the storage device 4 is equal to or less than the upper limit designated by the administrator (S2).

For example, the power control unit 34 selects "Lv2" as the power saving level when the upper limit value of the power consumption of the storage device 4 designated by the administrator is "1, 200 W", and selects "Lv1" as the power saving level when the upper limit value of the power consumption of the storage device 4 designated by the administrator is "1,300 W".

Subsequently, the power control unit 34 updates the current power saving level set in the storage device 4 (S3).

Specifically, when the process proceeds directly from step S1 to step S3, the power control unit 34 updates the power saving level registered in the set power requirement management table 33 to the power saving level delivered from the management API unit 36. Further, when the process proceeds from step S2 to step S3, the power control unit 34 updates the power saving level registered in the set power requirement management table 33 to the power saving level selected in step S2.

Further, the power control unit 34 specifies all component kinds of the controllable power consumption components mounted in the storage device 4 by referring to the device configuration management table 30 (FIG. 3), and acquires, from the power saving level management table 32 (FIG. 5), the performance level for each component kind at the power saving level updated on the set power requirement management table 33 as described above. Then, the power control unit 34 sets the operation mode of the controllable power consumption component of each component kind to the operation mode according to the corresponding performance level acquired as described above.

Next, the power control unit 34 refers to the set power requirement management table 33 and determines whether the low-load automatic power reduction function is currently set to "valid" in the storage device 4 (S4). When a positive result is obtained in this determination, the power control unit 34 ends the power requirement setting process.

On the other hand, when a negative result is obtained in the determination in step S4, the power control unit 34 acquires the performance level for each component kind of each controllable power consumption component at the power saving level after update in step S3 from the power saving level management table 32 (S5).

In addition, the power control unit 34 confirms the mounting position of each controllable power consumption component in the storage device 4 by referring to the device configuration management table 30 (FIG. 3), and sets the operation mode of these controllable power consumption components to an operation mode according to the performance level of the component type of the controllable power consumption component acquired in step S5 (S6). Then, the power control unit 34 ends the power requirement setting process.

(3-2) Power Saving Level Management Table Creation Process

Figure 9:
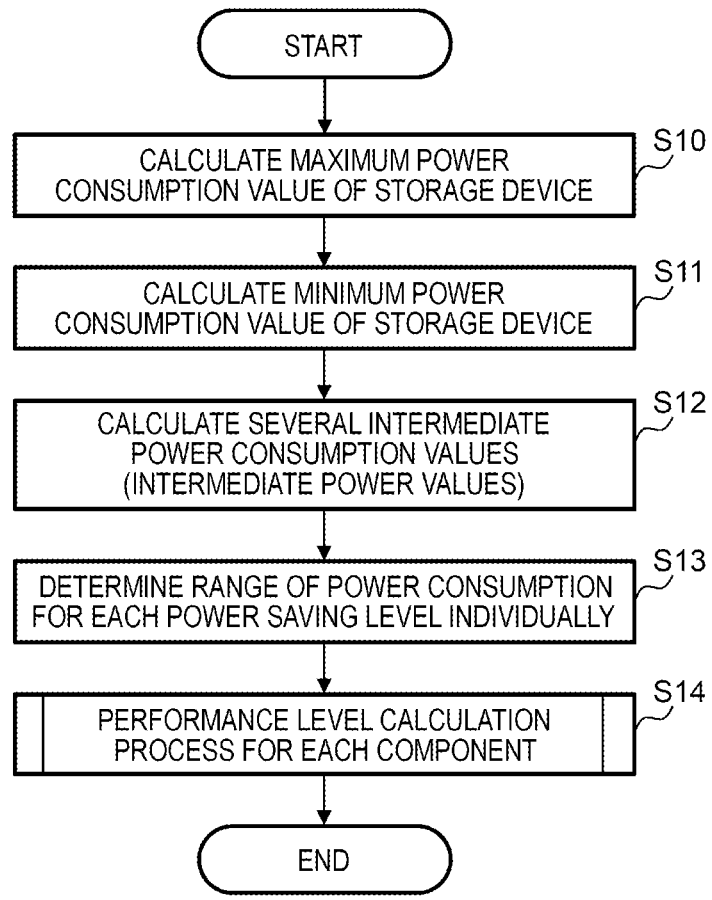
FIG. 9 is a flowchart showing a processing procedure of a power saving level management table creation process.

Meanwhile, FIG. 9 shows the flow of a process of a power saving level management table creation process that is executed by the power control unit 34 when the storage device 4 starts operating for the first time, or when the storage device 4 starts operating for the first time after the configuration of the storage device 4 is changed, such as, after replacement of the host interface 10, and addition of the drive 14. The power control unit 34 creates the power saving level management table 32 (FIG. 5) described above with reference to FIG. 5 according to the processing procedure shown in FIG. 9.

In practice, when the power saving level management table creation process shown in FIG. 9 is started at the timing described above, the power control unit 34 first refers to the device configuration management table 30 (FIG. 3) and the power consumption management table 31 (FIG. 4), and calculates the power consumption of the storage device 4 when the performance of all controllable power consumption components mounted in the storage device 4 is maximized as a maximum power value (S10).

Specifically, the power control unit 34 acquires all controllable power consumption components mounted in the storage device 4 from the device configuration management table 30, acquires, from the power consumption management table 31 (FIG. 4), the power consumption in the case of maximizing the performance of each controllable power consumption component (i.e., the power consumption when the performance level is "0" in FIG. 4), and adds up the power consumptions of these acquired controllable power consumption components to calculate the maximum power value.

Subsequently, the power control unit 34 refers to the device configuration management table 30 and the power consumption management table 31, and calculates the power consumption of the storage device 4 when the performance of all controllable power consumption components mounted in the storage device 4 is minimized as a minimum power consumption value (S11).

Specifically, the power control unit 34 acquires all controllable power consumption components mounted in the storage device 4 from the device configuration management table 30, acquires, from the power consumption management table 31, the power consumption in the case of minimizing the performance of each controllable power consumption component (i.e., the power consumption when the numerical value of the performance level is the maximum for the component type and the component kind in FIG. 4), and adds up the power consumptions of these acquired controllable power consumption components to calculate the minimum power value.

Next, the power control unit 34 calculates several intermediate power values between the maximum power value calculated in step S10 and the minimum power value calculated in step S12 as intermediate power values (S12), and then determines the power range of each power saving level (S13).

Specifically, the power control unit 34 determines the power range for each power saving level such that a range from the maximum power value to the largest intermediate power value is a power range of the power saving level of level 0, a range from the intermediate power value to the next largest intermediate power value is a power range of the power saving level of level 1, and so on, and a range from the lowest intermediate power value to the minimum power value is a power range of the highest power saving level.

Furthermore, the power control unit 34 calculates, for each power saving level, the performance level of each controllable power consumption component so that the power consumption of the storage device 4 falls within the power range of the power saving level, and registers, for each power saving level, the calculated performance level of each controllable power consumption component and the power range of the power saving level in the power saving level management table 32 (S14). Then the power control unit 34 ends the power saving level management table creation process.

Figure 10:
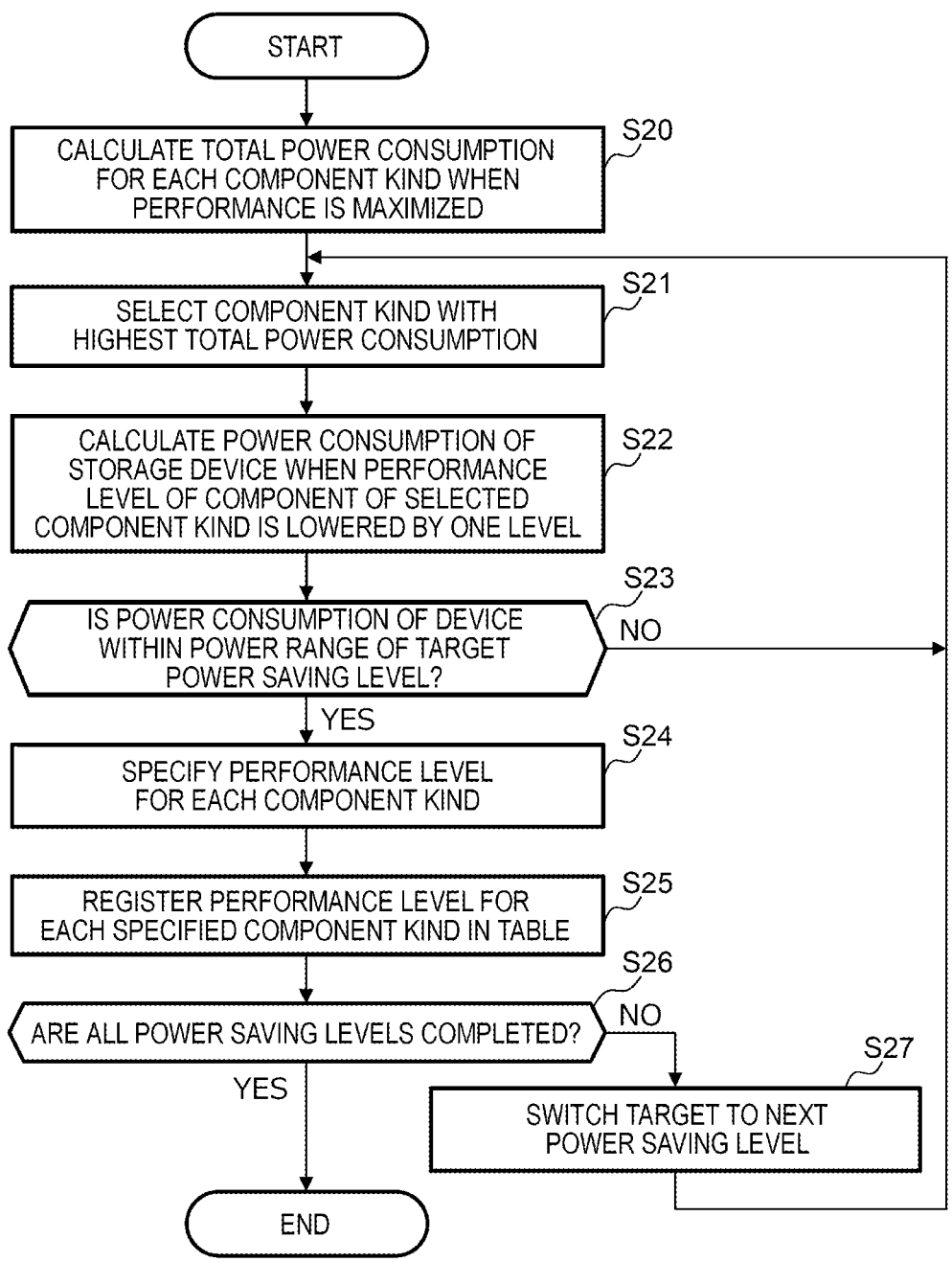
FIG. 10 is a flowchart showing a processing procedure of a performance level calculation process for each component.

FIG. 10 shows details of a specific series of processes (hereinafter, referred to as "performance level calculation process for each component") of the power control unit 34 in step S14. When the process proceeds to step S14 of the power saving level management table creation process, the power control unit 34 starts the performance level calculation process for each component shown in FIG. 10.

First, the power control unit 34 sets an initial state in which the performance of all controllable power consumption components mounted in the storage device 4 is maximized, and calculates the total value (hereinafter, referred to as "total power consumption") of the power consumption for each component kind of these controllable power consumption components in the initial state (S20).

Subsequently, the power control unit 34 selects one component kind with the largest total power consumption (S21), and calculates the power consumption of the storage device 4 in the case of lowering the performance levels of all controllable power consumption components of the component kind (hereinafter, referred to as "selected component kind") selected in step S21 mounted in the storage device 4 by one level (S22).

Next, the power control unit 34 determines whether the power consumption of the storage device 4 calculated in step S22 is within the power range of the target power saving level at that time (S23). It is to be noted that the target power saving level in the first step S23 is the power saving level of level 0.

When a negative result is obtained in this determination, the power control unit 34 returns to step S21, and then repeats the processes of step S21 to step S23 until a positive result is obtained in step S23. Through these repeated processes, the power consumption of the storage device 4 calculated in step S22 gradually decreases.

Then, when the power consumption of the storage device 4 calculated in step S22 exceeds the power range of the target power saving level at that time and falls within the power range of the power saving level that is one level lower, and a positive result is obtained in step S23, the power control unit 34 specifies the performance level of the controllable power consumption component for each component kind at that time (S24).

In addition, the power control unit 34 registers the performance level for each component kind specified in step S24 and the power range of the power saving level in the power saving level management table 32 for the current target power saving level (S25). Further, the power control unit 34 determines whether the processes of step S22 to step S25 are completed for all power saving levels (S26).

When a negative result is obtained in this determination, the power control unit 34 switches to, as the next target, a power saving level that is one level lower than the current target power saving level (i.e., to a power saving level that is one level lower in the power range) (S27), and then executes the process of step S21 to step S27 in the same manner as described above.

Further, the power control unit 34 executes the processes of step S21 to step S27 described above in the same manner until a positive result is obtained in step S26. Through these repeated processes, the performance level for each component kind of the controllable power consumption component at each power saving level is specified and registered in the power saving level management table 32.

Then, when a positive result is obtained in step S26, by finishing registering the performance level for each component kind of the controllable power consumption component at all power saving levels in the power saving level management table 32, the power control unit 34 ends the performance level calculation process for each component.

(3-3) Process of Determining Need for Low-Load Automatic Power Reduction

Figure 11:
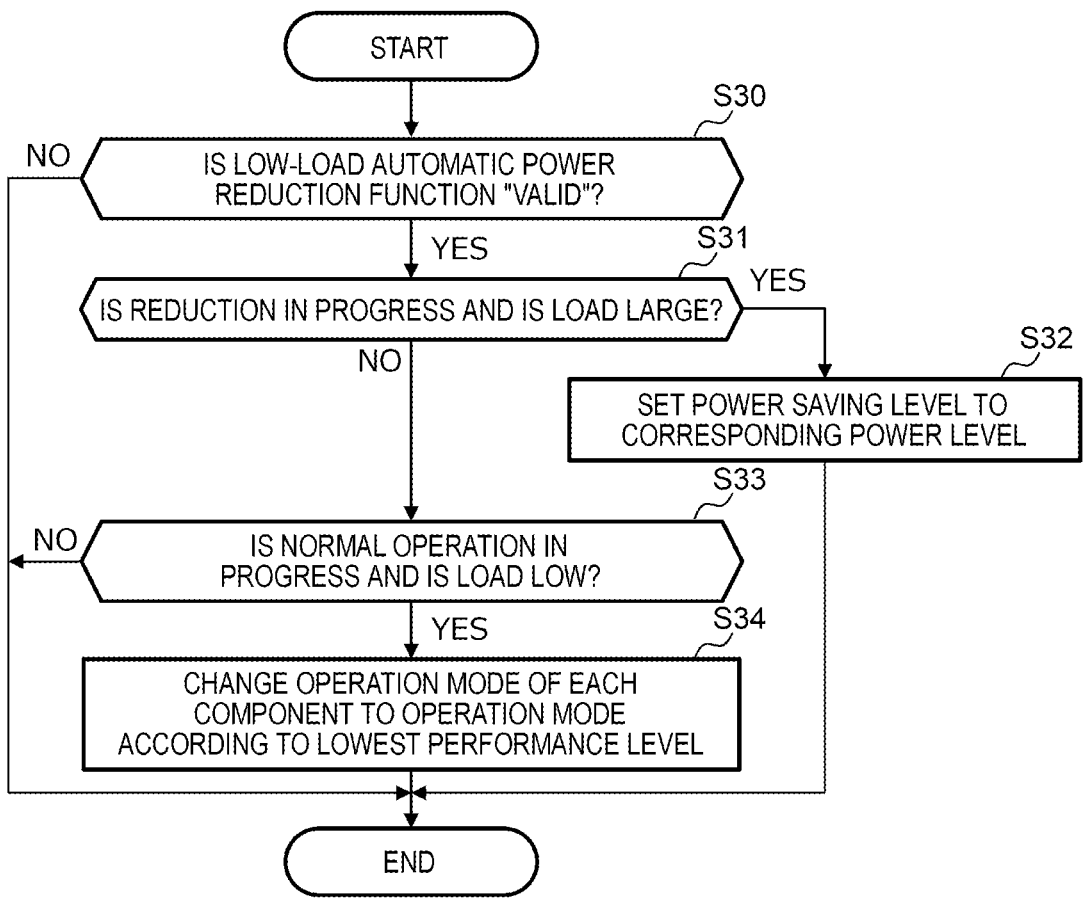
FIG. 11 is a flowchart showing a processing procedure of a process of determining need for low-load automatic power reduction.

Meanwhile, FIG. 11 shows the flow of a process of determining need for low-load automatic power reduction that is periodically executed (e.g., every 5 to 10 minutes) by the power control unit 34. According to the processing procedure shown in FIG. 11, the power control unit 34 periodically monitors a load of the storage device 4, and appropriately changes the performance level of each controllable power consumption component based on the monitoring result.

In practice, when the process of determining need for low-load automatic power reduction is started, the power control unit 34 first refers to the set power requirement management table 33 (FIG. 6) to determine whether the low-load automatic power reduction function of the storage device 4 is currently set to "valid" (S30). When a negative result is obtained in this determination, the power control unit 34 ends the process of determining need for low-load automatic power reduction.

On the other hand, when a positive result is obtained in the determination in step S30, the power control unit 34 determines whether the current load of the storage device 4 is large (non-low load) (S31). Then, when a positive result is obtained in this determination, the power control unit 34 resets the operation mode of each controllable power consumption component to the operation mode of the performance level corresponding to the power saving level set in the storage device 4 at that time (S32), and then ends the process of determining need for low-load automatic power reduction.

Specifically, the power control unit 34 refers to the set power requirement management table 33 and acquires the power saving level currently set in the storage device 4. Further, the power control unit 34 specifies all component kinds of the controllable power consumption component mounted in the storage device 4 by referring to the device configuration management table 30 (FIG. 3), and acquires, from the power saving level management table 32 (FIG. 5), the performance level for each component kind at the acquired power saving level as described above. Then, the power control unit 34 sets the operation mode of the controllable power consumption component of each component kind to the operation mode according to the corresponding performance level acquired as described above, and then ends the process of determining need for low-load automatic power reduction.

On the other hand, when a negative result is obtained in the determination in step S31, the power control unit 34 determines whether the storage device 4 is in normal operation with the low-load automatic power reduction function disabled (OFF) and in a low-load state (S33). When a negative result is obtained in this determination, the power control unit 34 ends the process of determining need for low-load automatic power reduction.

On the other hand, when a positive result is obtained in the determination in step S34, the power control unit 34 resets the operation mode of all controllable power consumption components mounted in the storage device 4 to the operation mode corresponding to the lowest performance level (S34), and then ends the process of determining need for low-load automatic power reduction.

(4) Effects of the Present Embodiment

As described above, in the storage device 4 of the present embodiment, when notified of the power requirements from the management terminal 3, the power control unit 34 refers to the power saving level management table 32, and sets the operation mode of each controllable power consumption component to the operation mode corresponding to the performance level determined for the power saving controllable component thereof at the power saving level according to the power requirements.

Therefore, according to the storage device 4 of the present embodiment, the power consumption of the storage device can be quickly transitioned to the power saving level designated by the administrator without requiring advance preparation, schedule creation, or the like. Therefore, according to the storage device 4 of the present embodiment, power control can be performed easily and quickly.

In addition, when the low-load automatic power reduction function is set to "valid" in such power requirements, the power control unit 34 sets the operation mode of each controllable power consumption component to the operation mode with the lowest performance level, and also periodically monitors the load of the storage device 4. Then, when the load exceeds the threshold value, the power control unit 34 sets the operation mode of each controllable power consumption component to the operation mode corresponding to the performance level determined for the power saving controllable component at the power saving level according to the power requirements notified from the management terminal, and when the load of the storage device 4 is equal to or less than the threshold value again, the power control unit 34 returns the operation mode of each controllable power consumption component to the operation mode with the lowest performance level.

Therefore, according to the storage device 4 of the present embodiment, the power consumption of the storage device can be easily reduced without controlling loads imposed from the outside such as I/O from the host, and internal processing performed in the storage device such as garbage collection.

(5) Other Embodiments

It is to be noted that, in the embodiment described above, it is described that the power saving level is defined in four levels from level 0 to level 3, but the invention is not limited thereto, and the power saving level may be defined in three levels or five levels or more.

Further, in the embodiment described above, it is described that the invention is applied to power control of the storage device 4, but the invention is not limited thereto, and it can be widely applied to various other target devices.

Furthermore, in the embodiment described above, the case in which the power control unit 34 is mounted in the storage device 4 has been described, but the invention is not limited thereto, and the power control unit 34 may be implemented in a computer device provided separately from the storage device 4 such that the power control of the storage device 4 may be performed from outside the storage device 4.

The invention can be widely applied to power control of a device equipped with one or a plurality of components capable of controlling power consumption by lowering a performance.

What is claimed is:

1. A power control apparatus that performs power control of a target device equipped with one or a plurality of components capable of controlling power consumption by lowering a performance, the power control apparatus comprising:
   a management interface unit configured to receive power requirement for performing the power control; and
   a power control unit configured to perform the power control of the target device in accordance with the power requirement received by the management interface unit,
   wherein the power control unit is configured to:
      based on power consumption for performance of each component of the target device and a device configuration of the target device, create power saving level management information that respectively defines the performance of each component at each power saving level associated with each of a plurality of divided power consumption ranges of the target device;
      based on a power consumption upper limit value or the power saving level of the target device designated as the power requirement received by the management interface unit, refer to the power saving level management information and set the performance of each component to a performance of the power saving level according to the power requirement, respectively,
         wherein, as the power requirement, valid or invalid state of a low-load automatic power reduction function for reducing power consumption of the target device at a low load is configured to be designated when a load of the target device is equal to or less than a predetermined threshold value;
      set the performance of each component to a lowest performance when the low-load automatic power reduction function is designated as valid; and
      reset the performance of each component to the performance of the power saving level according to the power requirement, respectively when the load of the target device is monitored and the load exceeds the threshold value.

2. The apparatus according to claim 1, wherein the target device is a storage device that provides a storage area for reading and writing data from and to a host device.

3. The apparatus according to claim 1, wherein the power control unit is further configured to set the performance of each component to a performance of the power saving level including the upper limit value within the power consumption range of the target device, respectively when the upper limit value of the power consumption of the target device is designated, as the power requirement.

4. The apparatus according to claim 1, wherein the power control unit is further configured to create the power saving level management information that respectively defines the performance of each component kind of the component at the power saving level.

5. The apparatus according to claim 4, wherein the power control unit is further configured to:
   repeat a first calculation process of respectively calculating, for each component kind, a total power consumption in the case of setting a maximum performance for all the components, and a second calculation process of calculating a power consumption of the target device in the case of lowering the performance of the component kind of the maximum total power consumption by one step, until the power consumption of the target device decreases within a power range of the target power saving level; and
   create the power saving level management information by determining the performance of each component kind when the power consumption of the target device falls within the power range of the target power saving level to be the performance of each component kind at the target power saving level.

6. A power control method executed by a power control apparatus that performs power control of a target device equipped with one or a plurality of components capable of controlling power consumption by lowering a performance, the power control method comprising:
   a first step of receiving power requirement for performing the power control; and
   a second step of performing power control of the target device in accordance with the received power requirement, wherein
   in the second step, the power control apparatus is configured to:
      based on power consumption for a performance of each component of the target device and a device configuration of the target device, create power saving level management information that respectively defines the performance of each component at each power saving level associated with each of a plurality of divided power consumption ranges of the target device;
      based on a power consumption upper limit value or the power saving level of the target device designated as the received power requirement, refer to the power saving level management information and set the performance of each component to a performance of the power saving level according to the power requirement, respectively,
      wherein, as the power requirement, valid or invalid state of a low-load automatic power reduction function for reducing power consumption of the target device at a low load can be designated when a load of the target device is equal to or less than a predetermined threshold value;
   set the performance of each component to a lowest performance when the low-load automatic power reduction function is designated as valid; and
   reset the performance of each component to the performance of the power saving level according to the power requirement, respectively when the load of the target device is monitored and the load exceeds the threshold value.

7. The method according to claim 6, wherein the target device is a storage device that provides a storage area for reading and writing data from and to a host device.

8. The method according to claim 6, wherein, in the second step, the power control apparatus is further configured to set the performance of each component to a performance of the power saving level including the upper limit value within the power consumption range of the target device, respectively when the upper limit value of the power consumption of the target device is designated as the power requirement.

9. The method according to claim 6, wherein, in the second step, the power control apparatus is further configured to create the power saving level management information that respectively defines the performance of each component kind of the component at the power saving level.

10. The method according to claim 9, wherein the power control apparatus is further configured to;
    repeat a first calculation process of respectively calculating, for each component kind, a total power consumption in the case of setting a maximum performance for all the components, and a second calculation process of calculating a power consumption of the target device in the case of lowering the performance of the component kind of the maximum total power consumption by one step, until the power consumption of the target device decreases within a power range of the target power saving level; and
    create the power saving level management information by determining the performance of each component kind when the power consumption of the target device falls within the power range of the target power saving level to be the performance of each component kind at the target power saving level.

* * * * *